United States Patent
Mack-Crane (10) Patent No.: US 7,502,325 B2
(45) Date of Patent: Mar. 10, 2009

(54) METHOD AND SYSTEM FOR MANAGING NETWORKS, NETWORK FRAGMENTS AND SUBNETWORKS

(75) Inventor: T. Benjamin Mack-Crane, Downers Grove, IL (US)

(73) Assignee: Tellabs Operations, Inc., Naperville, IL (US)

( * ) Notice: Subject to any disclaimer, the term of this patent is extended or adjusted under 35 U.S.C. 154(b) by 474 days.

(21) Appl. No.: 11/450,107

(22) Filed: Jun. 9, 2006

(65) Prior Publication Data

US 2007/0127388 A1  Jun. 7, 2007

Related U.S. Application Data

(60) Provisional application No. 60/739,684, filed on Nov. 23, 2005.

(51) Int. Cl.
*H04L 12/26* (2006.01)
*H04L 12/56* (2006.01)

(52) U.S. Cl. ............ 370/236.2; 370/241.1; 370/395.53; 370/401; 370/252

(58) Field of Classification Search ............... 370/236, 370/41.1, 242, 252, 389, 392, 395.53, 400, 370/401, 466, 236.2; 709/223–237; 379/1.01
See application file for complete search history.

(56) References Cited

U.S. PATENT DOCUMENTS

| 7,355,978 B2* | 4/2008 | Fontana et al. ........... 370/236.2 |
| 2006/0007867 A1* | 1/2006 | Elie-Dit-Cosaque et al. .......... 370/241.1 |
| 2006/0133284 A1* | 6/2006 | Elie-Dit-Cosaque et al. .......... 370/241.1 |

OTHER PUBLICATIONS

Maarten Vissers "Proposal for Alternative ETH Continuity and Connectivity Verification Method"; Presentation at standards Committee Meeting, 2005; 4 pgs.

* cited by examiner

*Primary Examiner*—Afsar M. Qureshi
(74) *Attorney, Agent, or Firm*—Lawrence Cho; Dean D. Small; The Small Patent Law Group LLP (57) ABSTRACT

A method and system are provided for verifying connectivity between monitoring points (MPs) within a network. The method comprises assigning, to each monitoring point, a unique MP ID and a unique sender MP ID and a unique receiver MP ID. Each sender MP ID uniquely identifying a sender MP from which a corresponding MP will receive valid monitoring messages. Each receiver MP ID uniquely identifying a receiver MP to which the corresponding MP transmits a valid monitoring message. The method further includes transmitting the monitoring messages MP ID in a unidirectional monitor cycle through the MPs, where each monitoring message includes a sender MP ID and a receiver MP ID. The method determines connectivity at each MP based on the sender and receiver MP IDs in a monitoring message received at the MP. Optionally, the method and system may report, from a monitoring point, a loss of connectivity when no valid monitoring message is received at the monitoring point for a predetermined number of monitor intervals. Optionally, when a monitoring message is received at a monitoring point with an incorrect sender MP ID, the monitoring point may report reception of an invalid monitoring message. The method further includes selecting one MP to send a broadcast monitoring message to verify membership in the network. Each MP receiving the broadcast monitoring message verifies that it belongs to the network. The MP sending the broadcast message listens for broadcast messages from other networks and detects mis-joined networks if any are received. Optionally, the broadcast monitoring message may be used to automatically configure MPs and configure the MPs into a monitoring cycle.

22 Claims, 10 Drawing Sheets

METHOD AND SYSTEM FOR MANAGING NETWORKS, NETWORK FRAGMENTS AND SUBNETWORKS

CROSS REFERENCE TO RELATED APPLICATIONS

The present application relates to, and claims priority from, provisional application Ser. No. 60/739,684, filed Nov. 23, 2005, entitled "METHODS FOR MANAGING NETWORKS, NETWORK FRAGMENTS AND SUBNETWORKS", the complete subject matter of which is expressly incorporated herein by reference in its entirety.

BACKGROUND OF THE INVENTION

The present invention generally relates to network monitoring and more particularly to verifying connectivity and detecting defects between monitoring points within a network.

Transport networks are used today to provide connectivity services to other networks. For example, transport networks may provide service links, connections, or form subnetworks that become part of the topology of a larger network. The topology of a network is generally static to support stable network operation and predictable performance across the network. Thus, transport services may have long holding times and it may become necessary to continuously monitor the transport services in order to ensure that the transport services continuously provide an agreed connectivity and performance. Traditionally, transport networks have been maintained over "connection oriented" networks, in which reference points are dedicated and exclusive to a communication link between one sender point and one receiver point. In a connection oriented network, the relationship between a sender point and receiver point is set up a priori. Methods exist for monitoring connection oriented networks in order to establish and provide means to detect a variety of defects in a connection, for example, misconnection, disconnection, bit error rate, etc.

However, more recently, connectionless networking technologies have been considered for providing transport services. Connectionless networks do not maintain exclusive communications links between reference points within the network. Examples of connectionless networking technologies are IP (Internet Protocol), Ethernet, CLNP (Connectionless Network Protocol), IPX (Internetwork Packet Exchange), DECnet, AppleTalk, token bus, token ring and FDDI (Fiber Distributed Data Interface). Connectionless transport services differ from connection oriented services primarily in that the reference points in a connectionless network are not exclusive to a communication link between one sender point and one receiver point. Instead, in a connectionless network, the relationship between a sender point and receiver point need not be set up a priori.

In connectionless networks, the receiver points at a boundary of the transport service may carry traffic from multiple sender points. In addition, the sender points at the boundary may transmit traffic to multiple receiver points. Thus, there are no identifiable exclusive connections to monitor. Therefore, conventional methods that are designed to monitor connection oriented networks are not easily applied to connectionless network monitoring.

Furthermore, connectionless transport services generally provide a connectionless subnetwork that affords connectivity among multiple points at the boundary of the subnetwork.

In many cases multiple transport services may be supported on a single physical network infrastructure. When multiple transport services are supported on a common infrastructure, the underlying network resources are partitioned between the transport services. For example, the network services may be partitioned between separate transport services to form a virtual network or network fragment.

However, defects that may arise with virtual networks or network fragments are different from those that may occur with a connection oriented network. A network fragment is defined by the set of boundary points which are allowed to exchange information in the context of the transport service. Examples of defects that may be experienced by network fragments are split network fragments, loss of connectivity to a member or point in the network, mis-joined network fragments and invalid members or points participating in a network fragment. A split network fragment may arise when disjoint subsets of a network fragment exist. A disjoint network fragment subset occurs when points at the boundary of a network fragment experience connectivity with other non-boundary points or members within the network fragment, yet the boundary points have lost connectivity with one another. A boundary point in a network fragment exhibits a loss of connectivity when the boundary point is no longer connected to non-boundary points within the network fragment. A mis-joined network fragment arises when connectivity exists between two or more network fragments that should not be connected to one another (e.g. able to exchange information). An invalid member exists within a network fragment when a boundary point, that is not a member of a network fragment, experiences connectivity to other points that are members of the network fragment.

Presently, standards are being defined regarding operation, administration and maintenance (OAM) functions for connectionless transport services, such as for Ethernet and IP in order to detect various defects in these networks and network fragments (e.g. virtual private networks). Current IP standards do not explicitly address detection of defects for connectionless network fragments. Further, draft Ethernet standards are being proposed regarding detection of certain types of defects; however, the mechanisms proposed thus far are complex and not easily scaled to large networks.

By way of example, one proposal for Ethernet OAM requires each monitoring point in a network fragment to multicast an OAM message to all other monitoring points. Multicasting the OAM message involves broadcasting the OAM message throughout an entire Ethernet fragment. Consequently, each monitoring point must receive and process the OAM messages from all other monitoring points within the network fragment.

Figure 1:
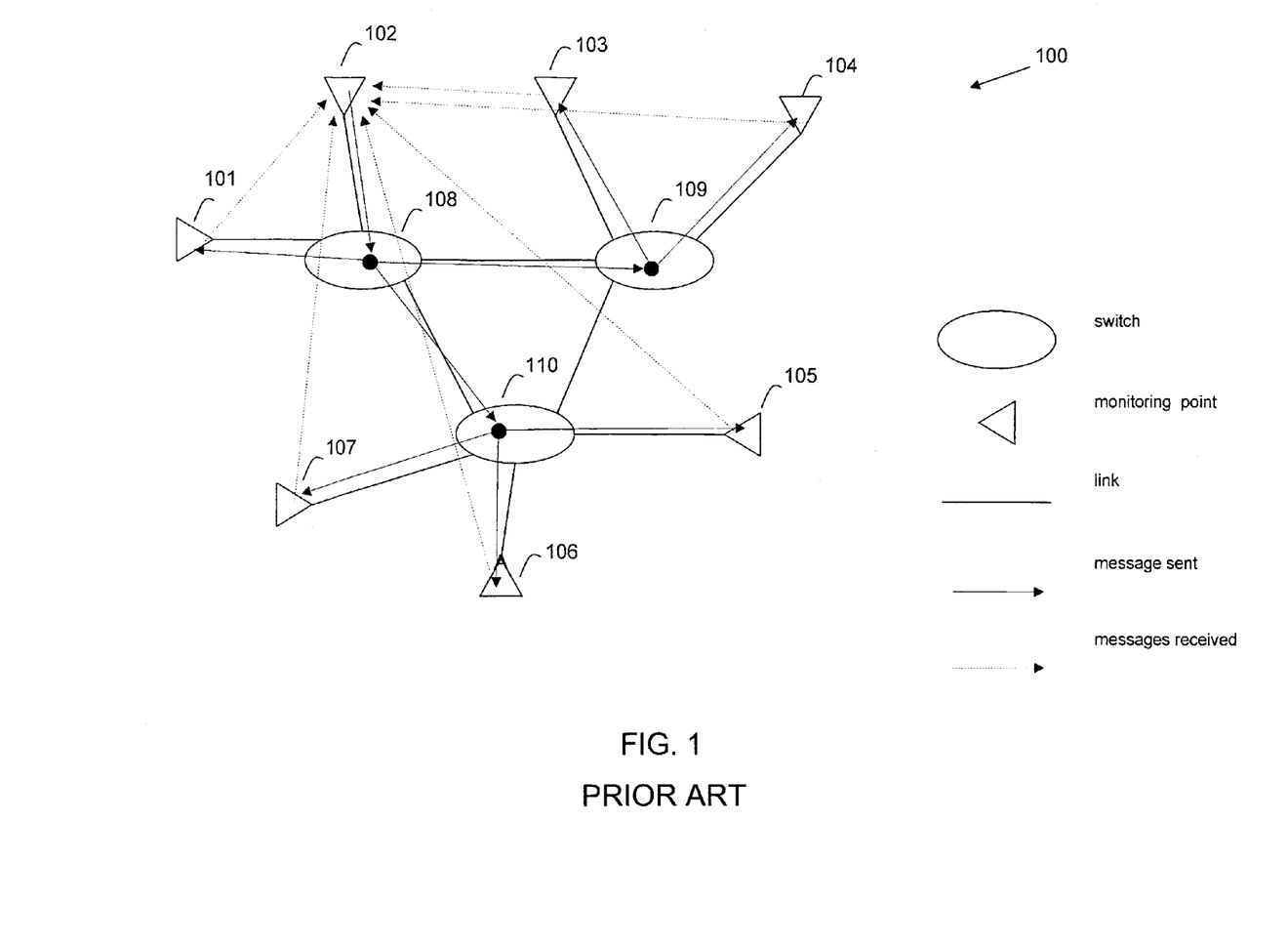
FIG. 1 illustrates a diagram of a conventional network monitoring process.

FIG. 1 illustrates an conventional network 100 that is configured to verify network connectivity through multicasting OAM or monitoring messages between monitoring points 101-107. The monitoring messages that are sent from monitoring point 102 are shown by solid arrows, while the monitoring messages that are received by monitoring point 102 are shown by dashed arrows. When utilizing the multicasting monitoring method of the network 100, in an N-point network fragment, each monitoring point must regularly receive monitoring messages from N−1 sender points, process monitoring messages from N−1 sender points, and maintain connectivity states with respect to N−1 sender points. For example, monitoring point 102 receives and processes monitoring messages from monitoring points 101, 107, 106, 105, 104 and 103. In addition, monitoring point 102 must also maintain connectivity states with respect to each of the monitoring points 101, 107, 106, 105, 104 and 103. Thus, the monitoring process implemented by network 100 places a large processing burden on each monitoring point for a network fragment having a large number of monitoring points.

Furthermore, the monitoring process implemented by network 100 incurs a large provisioning burden when a monitoring point is added to or removed from the network fragment. When a monitoring point is added to the network fragment, all other monitoring points must be informed (provisioned) of the change and instructed to expect (or no longer expect) monitoring messages from the added/removed monitoring point. Adding and removing monitoring points from a large network fragment introduces a large provisioning burden upon the network.

Also, the network 100 is unable to detect defects in unicast message forwarding between boundary points through the multicast monitoring message. The inability to detect defects in unicast message forwarding is due to the fact that the monitoring process of the network 100 utilizes a multicast address to send monitoring messages between boundary points. When a defect exists within a unicast forwarding process between boundary points, the conventional monitoring method is unable to isolate and recognize the defect. Instead, the conventional network 100 must separately test each unicast forwarding process between individual pairs of boundary points in addition to multicast monitoring. However, it is burdensome to test unicast forwarding between all pairs of boundary points in a large network fragment.

Finally, the use of a multicast address to send monitoring messages is problematic when different administrative entities want to monitor nested domains or areas of a network or network fragment. To enable different administrative entities to monitor multiple domains or areas, a mechanism must be provided to distinguish monitoring messages that are associated with the different administrative entities, in order to ensure monitoring messages are forwarded or captured appropriately, and to detect and handle leakage of monitoring messages outside of the intended administrative domain or area. This is similar to the "tandem connection monitoring" problem in connection oriented networks, in which a sub connection of a larger connection is to be monitored independently of the monitoring of the larger connection. In accordance with one current proposal, eight "monitoring levels" are defined. The use of multiple monitoring levels requires each monitoring point to recognize and filter monitoring messages based on the monitoring level indicated in the monitoring message. The addition of monitoring levels and the associated processing rules adds significant complexity to the monitoring mechanism.

A need remains for improved systems and methods of verifying connectivity and detecting defects between monitor points within a network.

BRIEF DESCRIPTION OF THE INVENTION

In accordance with an embodiment, a method is provided for detecting defects in connectivity between monitor points within a network. The method comprises assigning, to each monitoring point (MP), a unique sender MP ID and a unique receiver MP ID. Each sender MP ID uniquely identifying a sender MP from which a corresponding MP will receive valid monitoring messages. Each receiver MP ID uniquely identifying a receiver MP to which the corresponding MP transmits a valid monitoring message. The method further includes transmitting the monitoring messages in a unidirectional monitor cycle through the MPs, where each monitoring message includes a sender MP ID and a receiver MP ID corresponding to the sender MP and receiver MP of that monitoring message. The method detects defects at each MP based on the expected sender and receiver MP IDs in a monitoring message received at the MP or based on the lack of receipt of expected monitoring messages at the MP.

Optionally, the method may include reporting to a network manager, from a monitoring point, a loss of connectivity when no valid monitoring message is received at the monitoring point for a predetermined number of monitor intervals. Optionally, when a monitoring message is received at a monitoring point with an incorrect sender MP I D, the monitoring point may report reception of an invalid monitoring message to the network manager. Optionally, when a monitoring message is received at a monitoring point with an incorrect sender MP ID, the monitoring point may report reception of the invalid sender MP.

In accordance with an alternative embodiment, a monitoring point MP is provided for detecting defects within a network between a current MP and a sender MP and a receiver MP assigned to the current MP. The current MP includes memory that stores a sender MP ID and a receiver MP ID. The sender MP ID uniquely identifies a sender MP from which the current MP expects to receive valid monitoring messages. The receiver MP ID uniquely identifies a receiver MP to which the MP is to transmit valid monitoring messages. A MP network interface is provided to receive monitoring messages that include sender and receiver MP IDs that identify the upstream sender MP and a destination or downstream receiver MP to which the monitoring message is directed. The monitoring point further includes a cycle control module that determines when the monitoring message is valid based on the sender and receiver MP IDs in the monitoring message and stored in the memory.

The MP network interface and cycle control module cooperate to convey monitoring messages in a unidirectional cycle such that valid monitoring messages, associated with one MP, are received from only a single assigned sender MP and are transmitted to only a single assigned receiver MP.

DETAILED DESCRIPTION OF THE INVENTION

Embodiments of the present invention provide simple and scalable methods and systems for monitoring networks, network fragments, and subnetworks. Exemplary embodiments of the present invention can be used with connectionless networking technologies such as IP, Ethernet, CLNP, IPX, DECnet, AppleTalk and token bus. Network fragments are virtual networks, and thus properties that may be attributed to a network may also be attributed to a network fragment. A subnetwork is a part of a network that has the same properties and behavior as the network but encompasses only a part of an extent of the network. The term "network" will be used throughout to refer to entire networks, network fragments, and subnetworks.

Embodiments of the present invention provide a unidirectional monitoring cycle that is simple and easily scalable. The amount of processing required at each monitoring point is small and fixed, regardless of the number of monitoring points in the network. In an exemplary embodiment, when adding a monitoring point to a network fragment, the network updates or provisions the new monitoring point and associated sender and receiver points, without any change to the provisioning of other unaffected monitoring points. In accordance with at least one embodiment, a network is provided that utilizes unicast addressing to send monitoring messages between monitoring points. The use of a receiver ID to identify the MP which is to receive the monitoring message allows an administrative entity to establish monitoring between monitoring points within individual network domains or areas without interfering with monitoring points established by other administrative entities, and without adding the complexity of multiple "monitoring levels." This last benefit can also be realized in connection oriented network monitoring, allowing tandem connection monitoring to be done without the added complexity of multiple monitoring levels.

Figure 2:
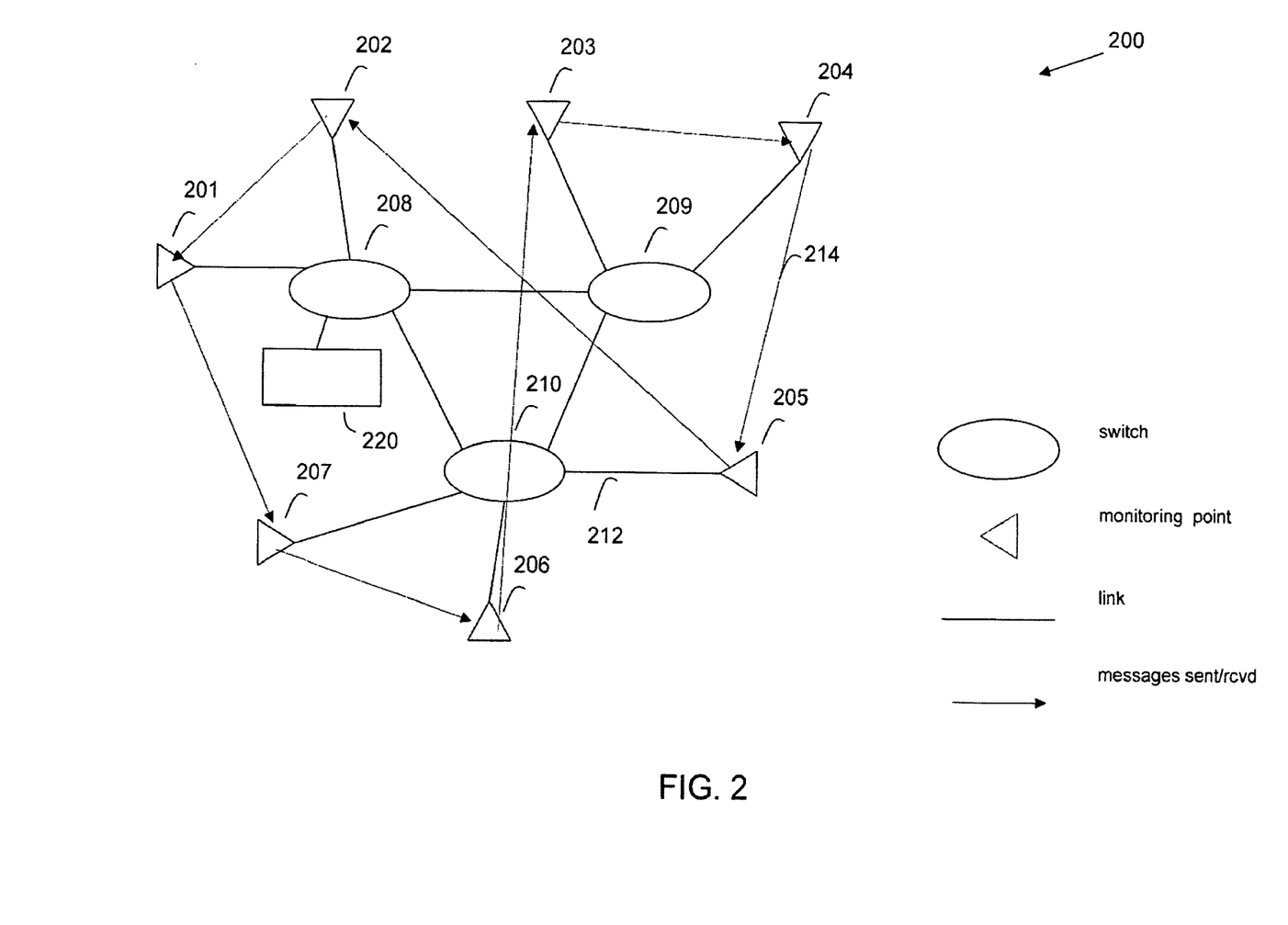
FIG. 2 illustrates a diagram of a unidirectional network monitoring process implemented in accordance with an embodiment of the present invention.

FIG. 2 illustrates a block diagram of a network 200 configured to implement a unidirectional monitoring cycle in accordance with an embodiment of the present invention. The network 200 represents a connectionless transport networks that includes a plurality of monitoring points 201-207 that are joined to one another through switches 208-210 over nonexclusive or connectionless links 212. The network 200 also includes a network manager 220 that initializes, enables, disables, monitors, adds, removes and otherwise manages the monitoring points 201-207. The network manager 220 provisions the monitoring points 201-207 with parameters as explained below in more detail. The monitoring points 201-207 detect defects, such as split network fragments, losses of connectivity with monitoring points 201-207, mis-joined network fragments, invalid members within a network fragment and the like. The monitoring points 201-207 transmit and receive monitoring messages between one another in a predetermined sequence and order, such as indicated in FIG. 2 by the unicast messages 214. The network manager 220 provisions (e.g. programs) the monitoring points 201-207 to convey the monitoring messages along the links 214 in a predetermined ordered cycle, also referred to as a "unidirectional monitoring cycle", that reduces the number of interactions that are performed by any given monitoring point 201-207 to a small, constant number.

For example, the ordered cycle starting at monitoring point 201 is: 201-207-206-203-204-205-202-201. Each monitoring point receives a unicast monitoring message from the previous or upstream monitoring point in the cycle and sends a unicast monitoring message to the next or downstream monitoring point in the cycle. For example, monitoring point 206 sends a unicast monitoring message to downstream monitoring point 203 and monitoring point 206 expects to receive a unicast monitoring message from upstream monitoring point 207. Each monitoring point 201-207 receives monitoring messages from a monitoring point 201-207 that is different from the monitoring point 201-207 to which monitoring messages are sent. The unidirectional monitoring cycle is sufficient to determine that all monitoring points 201-207 are connected to the network 200 and that all monitoring points 201-207 can be reached from at least one other monitoring point 201-207 in the network 200. By way of example, in a loop-free network topology, such as an Ethernet spanning tree, a monitoring cycle that includes all endpoints in the network (or boundary points in a subnetwork) will test all links in the network (or subnetwork).

Figure 3:
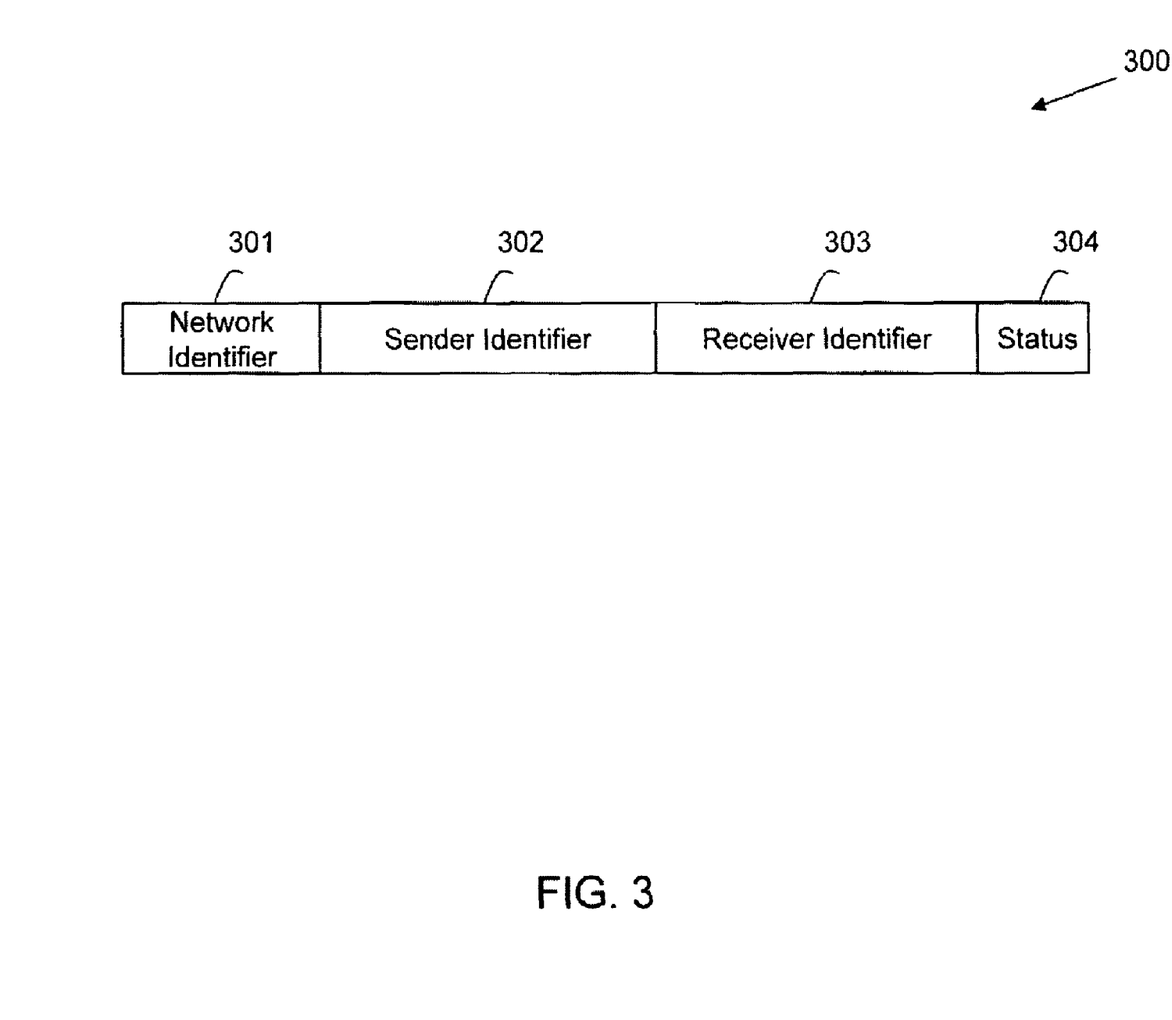
FIG. 3 illustrates a data structure for a monitoring message formatted in accordance with an embodiment of the present invention.

FIG. 3 illustrates a data structure for a monitoring message 300 that is transmitted between monitoring points in accordance with an embodiment of the present invention. The monitoring message 300 includes a network identifier field 301, a sender monitoring point identifier (MP ID) field 302, and a receiver MP ID field 303 and a status field 304. The network identifier field 301, sender MP ID field 302 and receiver MP ID field 303 collectively enable determination of proper membership in a network and enable confirmation of the ability to send information from the sender MP to the receiver MP within the network. Optionally, the monitoring message 300 may be signed, encrypted, and authenticated to guard against various attacks and increase confidence in the monitoring information.

The status field 304 may be utilized to carry the administrative state of the monitoring function. An administrative state bit in the status field 304 indicates whether the monitoring function is enabled or disabled. When the monitoring function is disabled, defect indications are not reported by the monitoring point. When the monitoring function is enabled, defect indications are reported. A monitoring point indicates its administrative state in the status field 304 of the monitoring messages 300 that the corresponding monitoring point sends. In order to enable the monitoring function (e.g., report defects), both the sender MP and receiver MP should be enabled.

Figure 4:
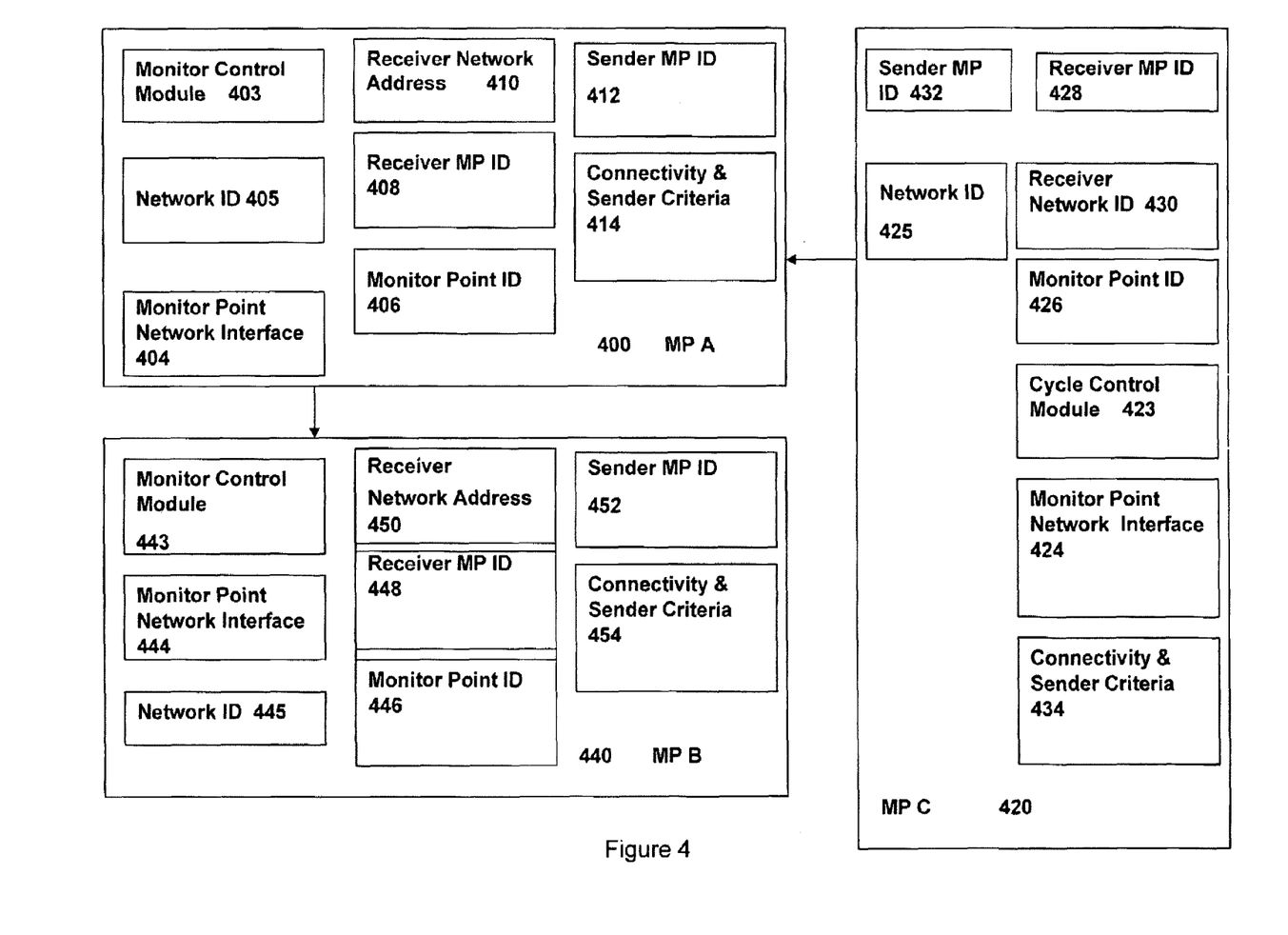
FIG. 4 illustrates a block diagram of a series of monitoring points joined in a unidirectional monitoring cycle in accordance with an embodiment of the present invention.

FIG. 4 illustrates a block diagram of a series of monitoring points 400, 420, 440 provisioned in a portion of a unidirectional monitoring cycle in accordance with an embodiment of the present invention. Each monitoring point 400, 420, 440 includes a monitor control module 403, 423, 443 and an MP network interface 404, 424, 444. The monitor control modules 403, 423, 443 control and implement the unidirectional monitoring cycle based on parameters that are provided to the monitoring points 400, 420, 440 from the network manager 220 (FIG. 2) or by other means (e.g., an autoconfiguration protocol). The MP network interface 404, 424, 444 serves as the interface to receive and transmit packets over the network 200 (FIG. 2). Each monitoring point 400, 420, 440 is configured, prior to a monitoring cycle, with a unique set of monitoring parameters, including a network ID 405, 425, and 445, monitor point ID 406, 426 and 446, a receiver MP ID 408, 428 and 448, a receiver network address 410, 430 and 450, a sender MP ID 412, 432 and 452, and connectivity and sender criteria 414, 434 and 454.

The network ID 405, 425, and 445 represents a unique ID that identifies the particular network to which the monitoring points 400, 420, and 440 belong. The monitor point ID 406, 426 and 446 represents a unique ID within the context of the network assigned by the network manager 220 to each monitoring point 400, 420 and 440, respectively (e.g., MP A, MP B, MP C), or derived by some means ensuring uniqueness in the context of the network. The receiver network address 410 identifies a network address (e.g., a MAC address) of monitoring point 440, to which monitoring messages are to be transmitted from the monitoring point 400. The monitoring point 420 stores as the receiver network address 430 the address of the monitoring point 400. The receiver network address 430 is used as the destination address in the network technology specific header of a unicast monitoring message 300 (FIG. 3). The receiver MP IDs 408, 428, and 448 identify the downstream MP to which the current MP has been programmed to transmit monitoring messages. The receiver MP ID 408 of MP 400 corresponds to the MP ID 446 of MP 440. The receiver MP ID 448 of MP 440 corresponds to the MP ID of another MP (not shown).

The sender MP IDs 412, 432 and 452 correspond to the monitoring point 400, 420, 440 that has been designated to send monitoring messages. In the example of FIG. 4, the sender MP ID 412 corresponds to the MP ID 426 of the monitoring point 420, while the sender MP ID 452 of MP 440 corresponds to the MP ID 406 of the MP 400. The connectivity and sender criteria 414, 434, 454 identify an amount of time/intervals that the monitoring point 400, 420, 440 may detect defects (e.g. receive invalid monitoring messages) or an amount of time/interval that may pass without receiving any monitoring message before an error or defect is reported to the network manager 220.

During operation, when the MP network interface 404 receives a packet, the MP network interface 404 checks the information of the packet for, among other things, the packet type, the network ID, and the receiver ID to which the packet is directed. The network identifier field 301 (FIG. 3) is matched against the network ID 405 (FIG. 4). The receiver ID 303 (FIG. 2) is matched against the MP ID 406 (FIG. 4). When the packet has a monitoring message type and includes the matching network ID and MP ID of the current monitoring point 400, the MP network interface 404 passes the monitoring message to the monitor control module 403. The monitor control module 403 parses the monitoring message to detect defects as explained below.

To configure a monitoring cycle, the network manager 220 provisions each monitoring point with the parameters, such as the network identifier, the monitoring point identifier (e.g. the sender ID that will appear in monitoring messages sent by the monitoring point, and receiver ID expected to appear in monitoring messages received), the network address of the monitoring point to which monitoring messages is to be sent (e.g. the next monitoring point in the cycle), the identifier field of the monitoring point to which to send monitoring messages (e.g. receiver identifier field to be placed in the monitoring message), and the identifier field of the monitoring point from which the current monitoring point expects to receive monitoring messages (e.g. expected sender ID in monitoring messages from the previous monitoring point in the cycle). A monitoring cycle includes all of the desired monitoring points configured as a single cycle.

Figure 5:
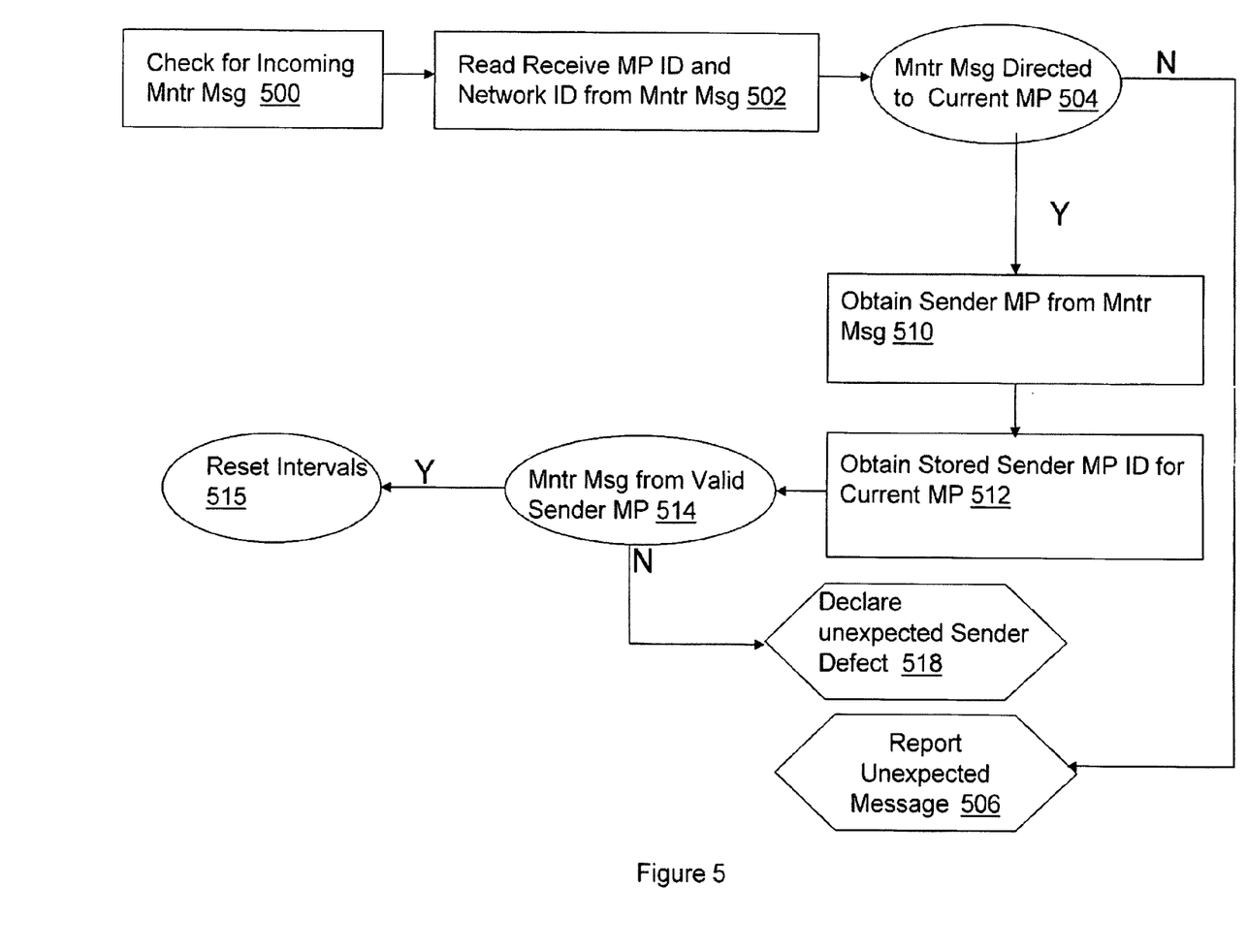
FIG. 5 illustrates a processing sequence carried out in detecting defects between a current monitoring point and a sender monitoring point in accordance with an embodiment of the present invention.

FIG. 5 illustrates a processing sequence carried out in connection with detecting defects between a current monitoring point and a sender monitoring point in accordance with an embodiment of the present invention. The example of FIG. 5 will be explained assuming the MP 400 of FIG. 4 is the current MP. At 500, the MP network interface 404 receives an incoming packet and identifies the incoming packet as a monitoring message. When a monitoring message is received that is addressed to the current monitoring message, then flow moves from 500 to 502. At 502, the monitor control module 403 reads from the monitoring message 300, the network ID field 301 and the receiver identifier field 303 receiver MP. At, 504, the monitor control module 403 compares the receiver MP ID and the network ID in the monitoring message with the stored receiver MP ID 406 and the stored network ID 405. When the incoming and stored MP IDs and/or network IDs do not match, then, in a connectionless network, an unexpected message defect is detected. Alternatively, in a tandem connection monitoring application, when the incoming and stored MP IDs and/or network IDs do not match, the message is passed without further processing.

When the incoming and stored receiver MP IDs and network IDs match, the receive portion of the monitoring message is valid and flow passes to 510. At 510, the sender MP ID is obtained from the monitoring message and at 512 the stored sender MP ID 412 is obtained from the MP 400. At 514, the incoming and stored sender MP IDs are compared. When the incoming and stored sender MP IDs match, a valid monitoring message is determined and flow passes to 515. At 515, the interval state variables for detecting loss of connectivity are reset. When the incoming and stored sender MP IDs do not match, an unexpected or invalid monitoring message is identified and flow passes to 518. At 518, an unexpected sender defect is declared.

Figure 6:
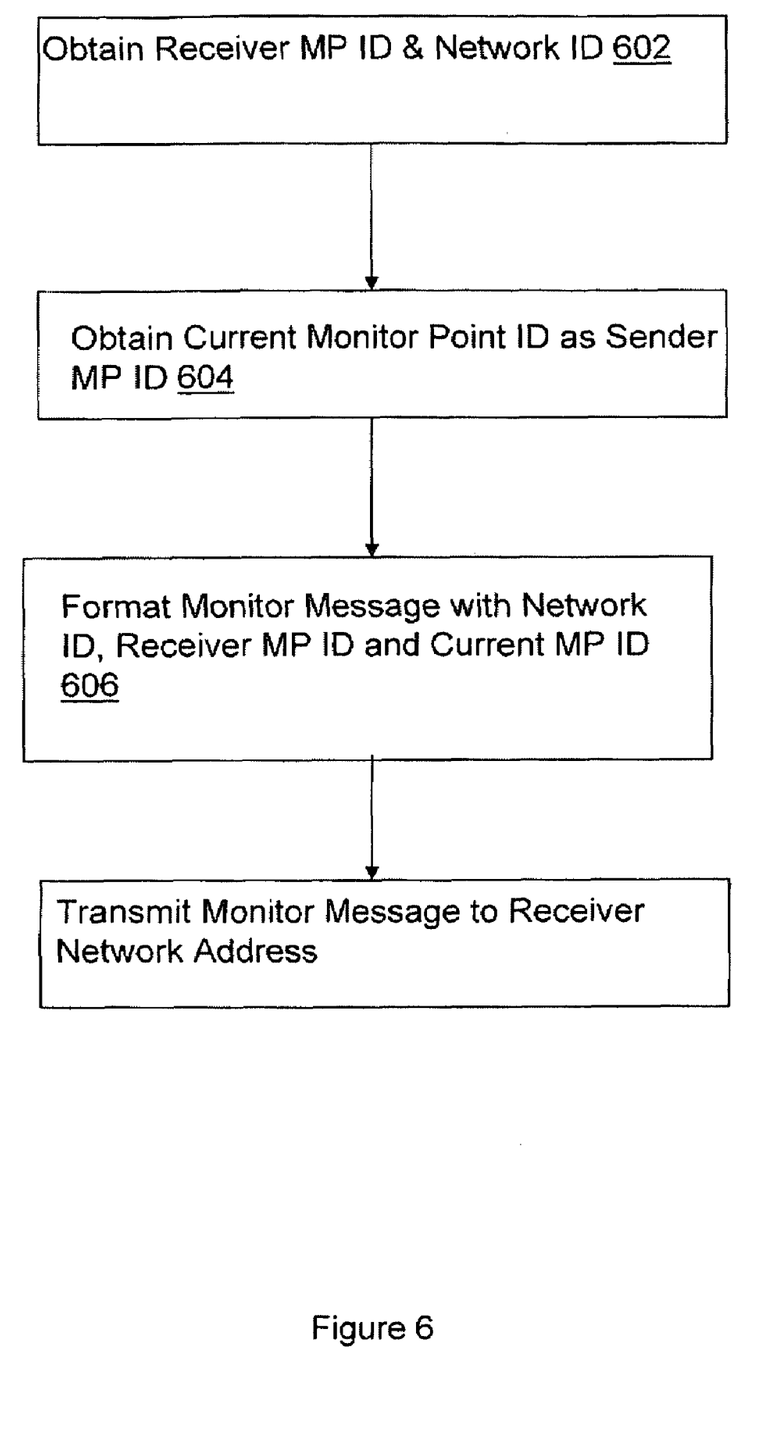
FIG. 6 illustrates a processing sequence to format and transmit a monitoring message from a current monitoring point to a destination monitoring point in accordance with an embodiment of the present invention.

FIG. 6 illustrates a processing sequence to format and transmit a monitoring message from a current monitoring point to a destination or downstream monitoring point in accordance with an embodiment of the present invention. At 602, the monitor control module 403 obtains the receiver MP ID 408 and network ID 405 from memory. At 604, the monitor control module 403 obtains its own MP ID 406 from memory. At 605, the monitor control module 403 loads the receiver MP ID 408 of MP 440 into the receiver MP ID field 303 and the network ID 405 into the network ID field 301. At 606, the monitor control module 403 also loads its own MP ID 406 into the sender MP ID field 302. At 608, the monitor control module 403 transmits the monitor message 300 to the downstream MP 440, providing the receiver network address 410 for use in a technology specific network header (when appropriate).

Once a monitoring cycle is configured and the monitoring points enabled, each monitoring point performs two activities. The MP sends a properly formatted monitoring message to the designated receiver MP, namely the next downstream monitoring point in the cycle, at predetermined intervals. The MP also verifies that a properly formatted monitoring message is received within a predetermined period from the expected upstream monitoring point, namely the previous monitoring point in the cycle. The verification activity detects the following defects, namely loss of connectivity (if no monitoring message from the expected sender is received for a predetermined period such as three consecutive intervals), and unexpected sender (if a predetermined number of monitoring messages are received, in any predetermined period such as three consecutive intervals, for which the sender identifier field does not match the expected value).

State variables that keep track of defects at an MP are cleared under the following conditions. The state variable that tracks loss of connectivity is cleared when at least a predetermined number of monitoring messages from the expected sender are received in a predetermined period such as three consecutive intervals. A state variable that tracks unexpected senders is cleared if no monitoring message is received, in a predetermined period such as three consecutive intervals, for which the sender identifier field does not match the expected value. The loss of connectivity defect indicates either a split network condition or loss of connectivity to a member of the network. The unexpected sender defect likely indicates misconfiguration of the monitoring cycle.

Figure 7:
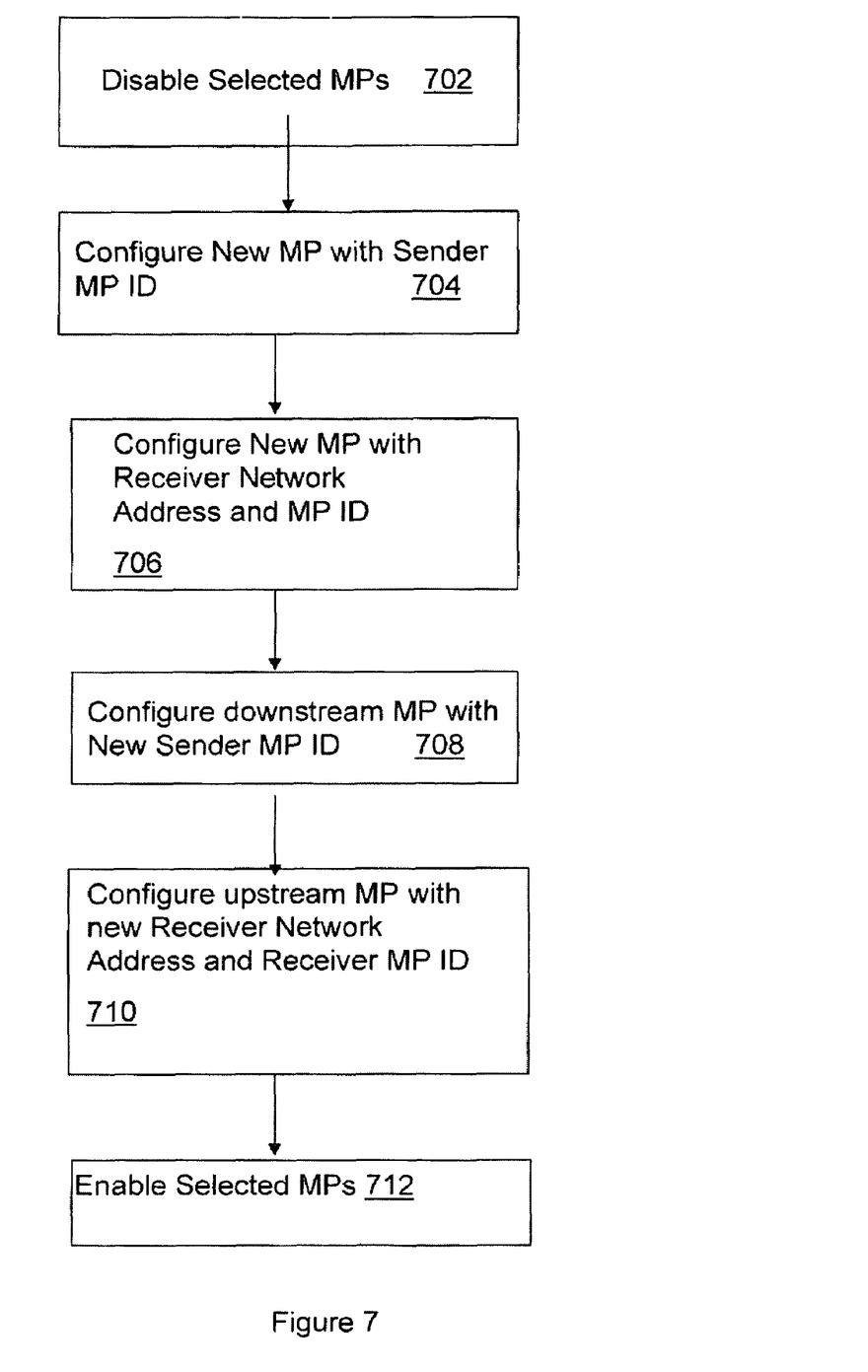
FIG. 7 illustrates a processing sequence carried out to add a monitoring point to a network.

FIG. 7 illustrates a processing sequence carried out to add a monitoring point to a network. FIG. 7 will be described in connection with the example of FIG. 4 to add a new monitoring point between MP 400 and MP 420. At 702, current MP 400 and upstream MP 420 are disabled. MP 440 need not be disabled at 702 as the cycle parameters of MP 440 are not changed. At 703, the new monitoring point is configured with the network ID of the network containing the monitoring points 400, 420, and others. At 704, the new monitoring point is configured with a sender MP ID that corresponds to the MP ID 426 of MP 420, in order to inform the new monitoring point to expect monitoring messages from MP 420. At 706, the added MP is configured with a receive network address of MP 400 and is configured with a receiver MP ID that corresponds to the MP ID 406 of MP 400, in order to instruct the added MP to direct outgoing monitoring messages to MP 400. At 708, MP 400 is reconfigured with a new sender MP ID 412 that corresponds to the MP ID of the new MP. At 710, MP 420 is reconfigured with a new receive network address 430 that corresponds to the network address of the added MP. The MP 420 is also reconfigured with a new receiver MP ID 428 that corresponds to the MP ID of the added MP. At 712, MPs 400 and 420, and the added MP are enabled.

Figure 8:
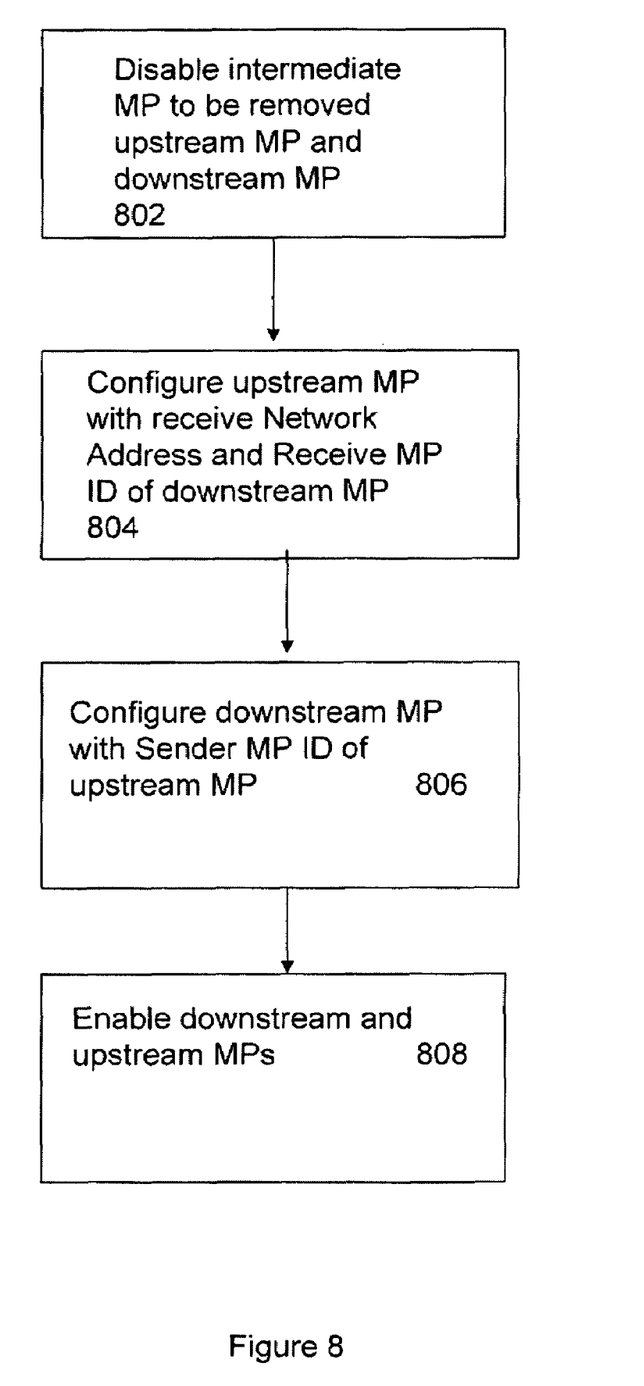
FIG. 8 illustrates a processing sequence carried out to remove a monitoring point from a network.

FIG. 8 illustrates a processing sequence carried out to remove a monitoring point from a network. With continued reference to FIG. 4, by way of example, it may be desirable to remove MP 400 from the network and directly link MPs 420 and 440. For purposes of illustration, the MP 420 may also be referred to as the upstream MP, while MP 440 may be referred to as the downstream MP. At 802, MPs 400, 420 and 440 are disabled. At 804, the upstream MP 420 is reconfigured to change the receive network address 430 stored at MP 420 to correspond to the network address of MP 440. At 804, MP 420 is further reconfigured to change the receiver MP ID 428 to correspond to the MP ID 446 of MP 440. Thus, MP 420 is re-provisioned to direct monitoring messages to MP 440. At 806, the downstream MP 440 is reconfigured to change the sender MP ID 452 to correspond to the MP ID 426 of the upstream MP 420. Thus, MP 440 is re-provisioned to expect monitoring messages from MP 420. At 808, the MPs 420 and 440 are enabled.

Optionally a monitoring topology other than a single cycle may be provided. By creating monitoring points that maintain more than one send and one receive relationship, richer monitoring topologies may be realized. For example, subsets of monitoring points in the network can be configured as separate monitoring cycles (sub-cycles) and selected monitoring points on each sub-cycle can be configured into a second cycle (super-cycle) to verify connectivity among these sub-cycles.

Figure 9:
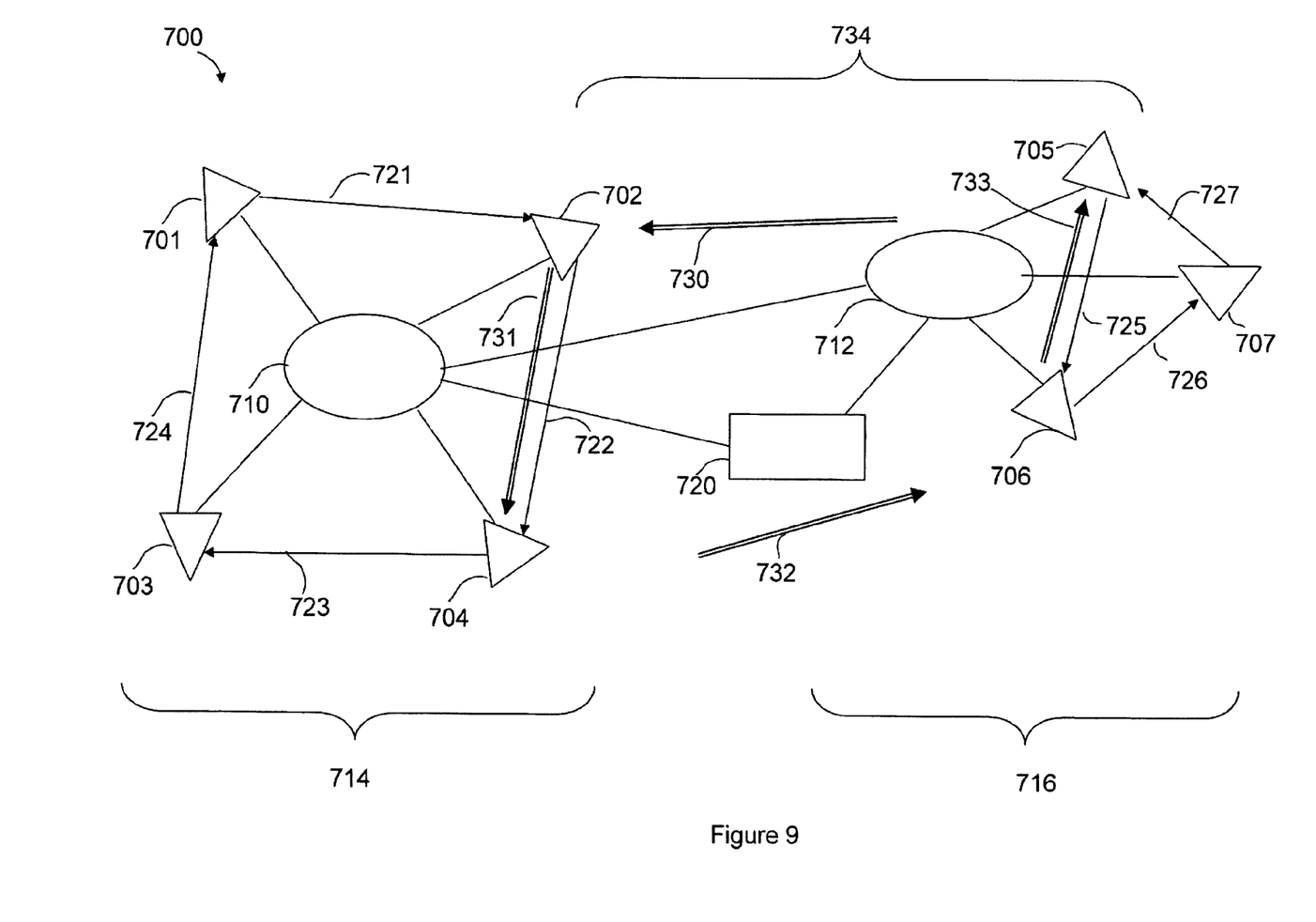
FIG. 9 illustrates a block diagram of a network 700 that is configured to include sub-cycles and super cycles.

FIG. 9 illustrates a block diagram of a network 700 that is configured to include sub-cycles and super cycles. The network 700 includes monitoring points 701-707 that are interconnected and switches 710 and 712. A network manager 720 communicates with each of the monitoring points 701-707 to organize the monitoring points 701-704 into a first sub-cycle 714 and to organize the monitoring points 705-707 into a second sub-cycle 716. The monitoring points 701-704 perform a unidirectional monitoring cycle in the order 701, 702, 703, 704, as denoted by arrows 721-724. The monitoring points 705-707 perform a unidirectional monitoring cycle in the order of 705, 706, and 707 as denoted by arrows 725-727.

In addition, the network manager 720 may identify select monitoring points (e.g. 705, 702, 704 and 706) as part of a super-cycle 734, between which monitoring messages are conveyed a long the path denoted by arrows 730-733. The super cycle 734 is tested to verify connectivity between the sub cycles 714 and 716.

Optionally the network manager 720 may provide alternative topologies. In large networks that are organized into hierarchical management domains monitoring cycles may be configured to match the management domain hierarchy. For example, if a communications service provider desires to manage the access, LATA, and InterLATA portions of an Ethernet service network separately, the service provider could configure a monitoring cycle in each access network. In addition, the service provider may configure a monitoring cycle in each LATA that included one or two monitoring points in each access network in the LATA and other monitoring points in the LATA. Also, the service provider may configure a monitoring cycle in the InterLATA network that included one or two monitoring points in each LATA and other monitoring points in the InterLATA portion of the network. Each of the above portions of the service provider's Ethernet network (access, LATA, InterLATA) may be considered a separate administrative domain and may represent a hierarchy of scope/reach. By configuring a monitoring cycle based on each access network, LATA or InterLATA, the network limits the interaction between different domains for monitoring purposes. While richer monitoring topologies may be somewhat more complex than simple topologies, embodiments of the present invention can more easily be scaled to suit these richer topologies.

Figure 10:
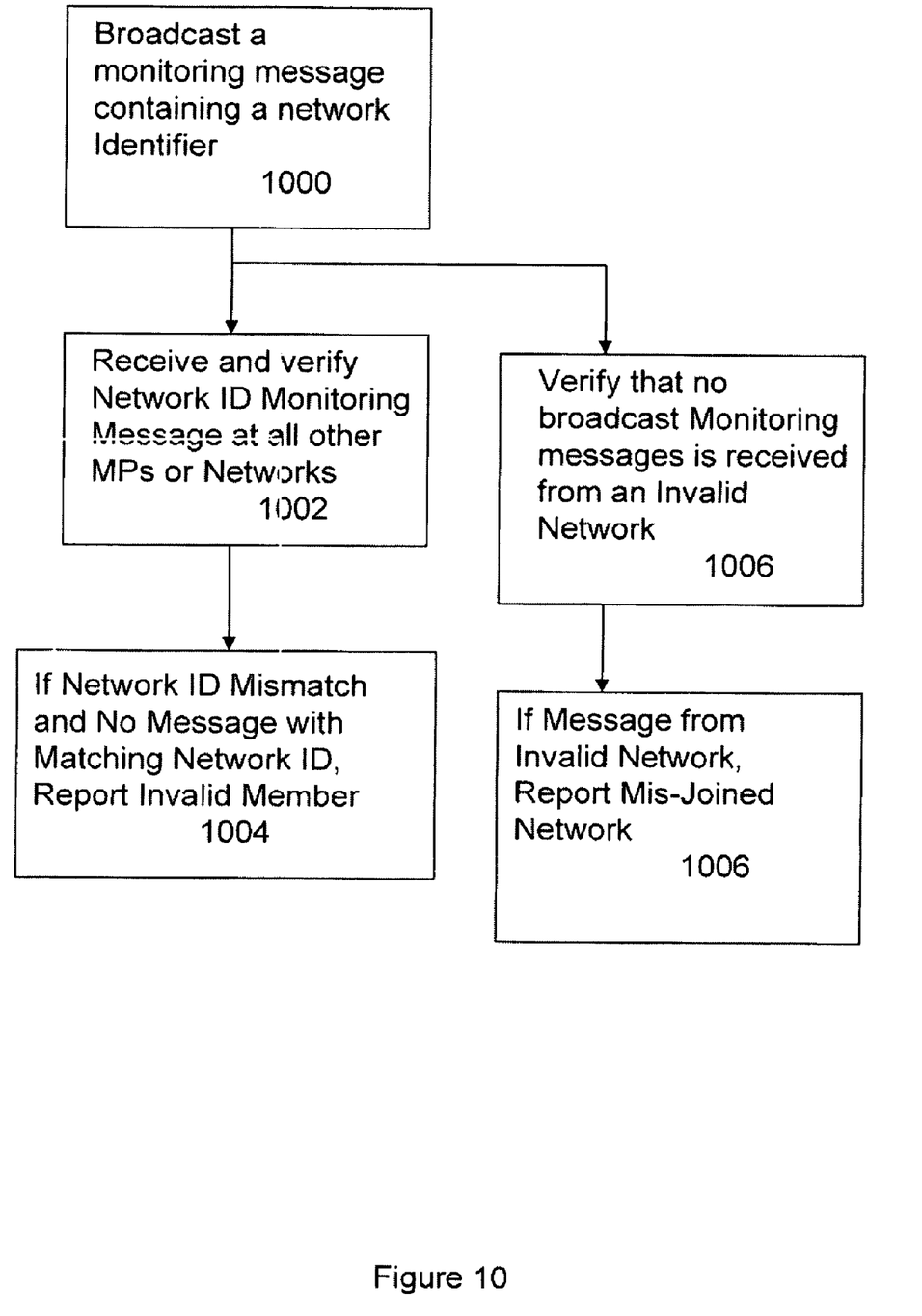
FIG. 10 illustrates a processing sequence carried out in connection with detecting mis-joined network fragments and invalid members.

FIG. 10 illustrates a processing sequence carried out in connection with detecting mis-joined network fragments and invalid members. At 1000, one monitoring point (the "broadcast monitoring point") is selected and instructed to broadcast a network identification monitoring message. The network identification monitoring message contains a network ID in the network identifier field 301 (FIG. 3). The network ID monitoring message may also contain, within the receiver identifier field 303 a special value indicating that all monitoring points on the corresponding network should receive the message. At 1002, all other monitoring points within the network receive the network ID monitoring message and verify the network ID saved within the network identifier field 301. To verify the network ID, each of the monitoring points compare the network ID from the network identifier field 301 to a network ID (e.g. 405 in FIG. 4) saved by the monitoring point. At 1004, when the network ID within the incoming network ID monitoring message does not match the saved network ID, and no monitoring messages are received with the expected network ID, the corresponding monitoring point indicates an invalid member defect and does not participate (send or receive traffic packets) in the network. Once the monitoring point is configured and enabled to function as a broadcast monitoring point, the monitoring point will transmit a properly formatted network ID monitoring message at regular intervals.

At 1006, the broadcast monitoring point verifies that no broadcast monitoring messages are received from a broadcast monitoring point associated with another network. At 1008, when the broadcast monitoring point receives a broadcast ID monitoring message from an unrelated network, the broadcast monitoring point may report the mis-joined network to its corresponding network manager. receiver MP With respect to mis-joined network defects, the broadcast MP resets the mis-joined network defect state variable when a predetermined number of consecutive broadcast intervals passed without reception of an unexpected network identifier. With respect to invalid member defects, the broadcast receiving MPs reset the invalid member defect state variable when a predetermined number of monitoring intervals pass without detection of any unexpected network identifiers, or a predetermined number of broadcast messages with the expected network identifier is received within the predetermined broadcast interval.

Optionally, the system may be configured to provide special monitoring points that protect against mis-joined networks. For example, at interfaces where extra security may be warranted, monitoring points may be configured to watch for broadcast monitoring messages with incorrect or invalid network identifiers. Upon detection of an incorrect or invalid network ID, the interface is disabled.

Optionally, a plug-and-play network may be provided in which monitoring points are configured to watch for a broadcast monitoring message. Upon receipt of a properly formatted broadcast monitoring message, the monitoring point automatically configures its network identifier to equal the network identifier value within the received broadcast monitoring message.

Additionally, monitoring points may be configured to send a message to the broadcast monitoring point registering as a member of the network. An exemplary embodiment may use a message similar to the message of FIG. 3 for this purpose, using the network identifier field 301, the sending monitoring point identifier field 302, and the status field 304. The status field may be used to indicate the registration status of the monitoring point (requesting registration).

Optionally, the network may be configured to automatically provision a monitoring cycle. When the broadcast monitoring point receives registration messages as described above, the broadcast monitoring message may be augmented with a list of monitoring points which are members of the network. As a list of monitoring points is then received by all the monitoring points in the network, it may be used as the basis for establishing the monitoring cycle. For example the monitoring cycle may be set to correspond to the order of the monitoring points in the list. When the monitoring cycle is set based on the above, the system eliminates the manual configuration of the many monitoring points.

In the foregoing description, embodiments of the invention are described with reference to specific example embodiments thereof. The specification and drawings are accordingly to be regarded in an illustrative rather than in a restrictive sense. It will, however, be evident that various modifications and changes may be made thereto, in a computer program product or software, hardware or any combination thereof, without departing from the broader spirit and scope of the present invention. Software embodiments of the present invention may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While the invention has been described in terms of various specific embodiments, those skilled in the art will recognize that the invention can be practiced with modification within the spirit and scope of the claims.

What is claimed is:

1. A method for detecting defects in connectivity between monitor points within a network, the method comprising:
    assigning, to each monitoring point (MP), a unique sender MP ID and a unique receiver MP ID, each of the sender MP IDs uniquely identifying a sender MP from which a corresponding MP receives valid monitoring messages, each of the receiver MP IDs uniquely identifying a receiver MP to which the corresponding MP transmits a valid corresponding monitoring message;
    transmitting monitoring messages in a unidirectional cycle of MPs, each of the monitoring messages including a sender MP ID and a receiver MP ID; and
    detecting defects in connectivity at each of the MPs based on the sender and receiver MP IDs in the monitoring message received at the MP.

2. The method of claim 1, further comprising reporting, from a MP, a loss of connectivity when no valid monitoring message is received at the MP for a predetermined number of monitor intervals.

3. The method of claim 1, further comprising, when a monitoring message is received, at a MP, with an incorrect sender MP ID, reporting a defect corresponding to reception, of an invalid sender MP.

4. The method of claim 1, further comprising receiving monitoring messages based on a match between the receiver MP ID in the message and the MP ID of the receiving MP.

5. The method of claim 1, wherein the detecting includes determining whether an incoming monitoring message, received at a MP, includes the receiver MP ID assigned to the MP.

6. The method of claim 1, further comprising assigning, to each sender MP, a MP network address of a receiver MP to which the sender MP transmits monitoring messages.

7. The method of claim 1, further comprising removing an MP to the network by reprovisioning the sender to receiver MP IDs only at MPs that directly communicated with the removed MP.

8. The method of claim 1, wherein the unidirectional cycle constitutes a cycle in which each of the MPs receive monitoring messages only from a single corresponding sender MP and in which each of the MPs transmits monitoring messages only to a single corresponding receiver MP.

9. The method of claim 1, further comprising Adding an MP to the network by reprovisioning the sender to receiver MP IDs only at MPs directly upstream and downstream of the added MP.

10. The method of claim 1, further comprising storing, at each of the MPs, the receiver MP ID and a receiver network ID, the receiver network MP ID uniquely identifying a network address of the receiver MP to which the corresponding MP transmits the monitoring messages.

11. The method of claim 1, wherein the sender MP IDs each define a one-to-one relation between one of the MPs functioning as a sender MP and one of the MPs designated to receive monitoring messages from the sender MP, and wherein the receiver MP IDs each define a one-to-one relation between one of the MPs functioning as a receiver MP and one of the MPs designated to transmit monitoring messages to the receiver MP.

12. A monitor point (MP) for detecting defects in connectivity within a network, the network including a sender and a receiver MP assigned to the MP, the MP comprising:
   memory storing a sender MP ID and a receiver MP ID, the sender MP ID uniquely identifying a sender MP from which the MP receives valid monitoring messages, the receiver MP ID uniquely identifying a receiver MP to which the MP transmits valid monitoring messages;
   a MP network interface receiving a monitoring message, the monitoring message including sender and receiver MP IDs identifying a sender MP transmitting the monitoring message and a destination MP to which the monitoring message is directed; and
   a cycle control module determining when the monitoring message is valid based on the sender and receiver MP IDs in the monitoring message and stored in the memory.

13. The monitor point of claim 12, wherein the MP network interface and cycle control module convey monitoring messages in a unidirectional cycle such that valid monitoring messages are received from only a single assigned sender MP and are transmitted to only a single assigned receiver MP.

14. The monitor point of claim 12, wherein the cycle control module determines connectivity based on a unidirectional cycle.

15. The monitor point of claim 12, wherein the MP network interface determines when the monitoring message is directed to the MP based on a destination network MP address stored in the monitoring message.

16. The monitor point of claim 12, wherein the cycle control module reports a loss of connectivity when no valid monitoring message is received at the MP network interface for a predetermined number of monitor intervals.

17. The monitor point of claim 12, wherein, when the monitoring message includes an incorrect sender MP ID, the cycle control module reports an invalid monitoring message.

18. The monitor point of claim 12, wherein the MP network interface determines whether the monitoring message includes the sender MP ID stored in the memory.

19. The monitor point of claim 12, wherein the MP network interface determines whether the monitoring message includes the receiver MP ID stored in the memory.

20. The monitor point of claim 12, wherein the MP network interface utilizes an MP network address assigned to the MP identify monitoring messages addressed thereto.

21. The monitor point of claim 12, wherein the cycle control module transmits the monitoring message to a unique network address assigned to the receiver MP.

22. The monitor point of claim 12, wherein the sender MP ID defines a one-to-one relation between one of the MP and another MP designated as a sender MP and wherein the receiver MP ID defines a one-to-one relation between the MP and another MP designated as a receiver MP.

* * * * *